(12) United States Patent
Zaitsev

(10) Patent No.: US 7,540,030 B1
(45) Date of Patent: May 26, 2009

(54) METHOD AND SYSTEM FOR AUTOMATIC CURE AGAINST MALWARE

(75) Inventor: Oleg V. Zaitsev, Smolensk (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 12/210,732

(22) Filed: Sep. 15, 2008

(51) Int. Cl.
G06F 11/00 (2006.01)
G06F 12/16 (2006.01)
G06F 15/18 (2006.01)
G08B 23/00 (2006.01)

(52) U.S. Cl. .............................. 726/24; 726/22; 726/23; 726/25; 713/187; 713/188

(58) Field of Classification Search ................... 726/22, 726/23, 24, 25; 713/187, 188
See application file for complete search history.

(56) References Cited

U.S. PATENT DOCUMENTS

| | | | |
|---|---|---|---|
| 6,701,441 B1* | 3/2004 | Balasubramaniam et al. | 726/25 |
| 6,895,513 B1* | 5/2005 | Balasubramaniam et al. | 726/24 |
| 6,971,019 B1* | 11/2005 | Nachenberg | 713/188 |
| 7,043,757 B2* | 5/2006 | Hoefelmeyer et al. | 726/24 |
| 7,281,267 B2* | 10/2007 | Tarbotton et al. | 726/22 |
| 7,360,249 B1* | 4/2008 | Szor et al. | 726/22 |
| 7,472,419 B1* | 12/2008 | Balasubramaniam et al. | 726/24 |
| 7,480,941 B1* | 1/2009 | Balasubramaniam et al. | 726/24 |
| 2002/0116627 A1* | 8/2002 | Tarbotton et al. | 713/200 |
| 2005/0086499 A1* | 4/2005 | Hoefelmeyer et al. | 713/188 |
| 2006/0031933 A1* | 2/2006 | Costa et al. | 726/22 |
| 2006/0174115 A1* | 8/2006 | Rao et al. | 713/168 |
| 2006/0179484 A1* | 8/2006 | Scrimsher et al. | 726/23 |
| 2007/0006314 A1* | 1/2007 | Costa et al. | 726/25 |
| 2007/0039048 A1* | 2/2007 | Shelest et al. | 726/22 |
| 2007/0143843 A1* | 6/2007 | Nason et al. | 726/22 |
| 2008/0016568 A1* | 1/2008 | Szor et al. | 726/22 |
| 2008/0098382 A1* | 4/2008 | Declercq et al. | 717/170 |
| 2008/0134335 A1* | 6/2008 | Kameda | 726/24 |
| 2009/0055693 A1* | 2/2009 | Budko et al. | 714/57 |

* cited by examiner

Primary Examiner—David García Cervetti
(74) Attorney, Agent, or Firm—Bardmesser Law Group

(57) ABSTRACT

The present invention is intended as a method, system and computer program product for identification of malware components based on automatically collected statistical data and providing effective cure to infected computer systems. The malware components on a user's computer system are identified and appropriate cure is administered in a form of cure scripts. The cure scripts are automatically generated based on collected comprehensive malware-related statistical data. The statistical data is collected through generating protocol logs of malware affected computer system. The protocol logs are stored in the database. The statistical data is also collected through emulation of known malware components. Cure solutions against malware in a form of scripts are also stored in the database for future references. The system constantly collects malware-related statistics (i.e., self-teaches) and effectiveness of the cure provided to infected computer systems is improved with time.

16 Claims, 6 Drawing Sheets

METHOD AND SYSTEM FOR AUTOMATIC CURE AGAINST MALWARE

BACKGROUND OF THE INVENTION

1. Field of the Invention

The present invention is related to anti-malware technology, and more particularly, to identification of malware components based on automatic collection of statistical data and to providing cure to infected computer systems.

2. Description of the Related Art

Detection of viruses and malware has been a concern throughout the era of the personal computers. With the growth of communication networks such as the Internet and increasing transfer of data, including the rapid growth of e-mail delivery, the infection of computers through communications or file exchanges is an increasingly significant consideration. Infections can take various forms and they are typically related to computer viruses, Trojan programs, or other forms of malicious code (i.e., malware).

Recent incidents of e-mail mediated virus attacks have been dramatic both for the speed of propagation and for the extent of damage, with Internet service providers (ISPs) and companies suffering service problems and a loss of e-mail capability. In many cases, attempts to adequately prevent file exchange or e-mail mediated infections significantly inconvenience computer users. Improved strategies for detecting and dealing with virus attacks are desired.

One conventional approach to detecting viruses is signature scanning. Signature scanning systems use sample code patterns extracted from known malware code and scan for the occurrence of these patterns in other program code. A primary limitation of the signature scanning method is that only known malicious code is detected, that is, only code that matches the stored sample signatures of known malicious code is identified as being infected. All viruses or malicious code not previously identified, and all viruses or malicious code created after the last update to the signature database, will not be detected.

In addition, the signature analysis technique fails to identify the presence of a virus if the signature is not aligned in the code in the expected fashion. Alternatively, the authors of a virus may obscure the identity of the virus by opcode substitution or by inserting dummy or random code into virus functions. Nonsense code can be inserted that alters the signature of the virus to a sufficient extent as to be undetectable by a signature scanning program, without diminishing the ability of the virus to propagate and deliver its payload.

Another virus detection strategy is integrity checking. Integrity checking systems extract a code sample from known, benign application program code. The code sample is stored, together with information from the program file, such as the executable program header and the file length, as well as the date and the time stamp of the sample. The program file is checked at regular intervals against this database to ensure that the program file has not been modified.

Integrity checking programs generate long lists of modified files when a user upgrades the operating system of the computer or installs or upgrades application software. A main disadvantage of an integrity check-based virus detection system is that a great many warnings of virus activity issue whenever any modification of an application program is performed. It is difficult for a user to determine when a warning represents a legitimate attack on the computer system.

Checksum monitoring systems detect viruses by generating a cyclic redundancy check (CRC) value for each program file. Modification of the program file is detected by a difference in the CRC value. Checksum monitors improve on integrity check systems in that it is more difficult for malicious code to defeat the monitoring. On the other hand, checksum monitors exhibit the same limitations as integrity checking systems in that many false warnings issue, and it is difficult to identify which warnings represent actual viruses or infection.

One of the problems in the field of anti-virus software is the fact that many users are unwilling to wait for a long time for the anti-virus software to do its work. As a practical matter, most users are willing to wait a fraction of a second, perhaps a second or two, when starting an application, but are rarely willing to wait substantially longer than that. On the other hand, in such a relatively short period of time, only the more rudimentary anti-virus checks are possible. This presents a problem for the anti-virus software vendor, because the need to check the executable file being launched for viruses must be weighted against the amount of time that a thorough anti-virus check would take.

One of the issues involved in modern anti-virus technology is the fact that anti-virus and anti-malware databases get updated with a certain delay, after a new malware/virus appears. This is a particularly acute problem when multiple different malware components infect a computer at one time. For example, a typical such scenario is where a browser on a local computer is infected with a small downloader file. The small downloader file then contacts a server, to download a bigger downloader file. The second downloader file then downloads a number of malware components, often between 10 and 20 distinct components. These can include malware for sending out spam, various trojans, identity theft malware, and so on.

Of these multiple components, some are already known to anti-malware databases and anti-malware software vendors, but frequently not all of the components are known. Thus, even upon a detection of infection by the malware, the anti-virus software "cures" the computer, but only of those components which are known to it. Once the "cure" is complete, the anti-malware software thinks that the incident is over, and computer operations proceed as before. However, those malware components that were unknown to the anti-malware software remain, often for days, performing their activities without the user being aware of it.

In the conventional approach, a human being needs to review the logs of the protocols of computer systems to detect some unusual patterns in order to identify the malware. Then, when the malware is detected, this person administers the cure to the infected computer system. This cure is typically provided in a form of a script written by the administrator in order to address a particular problem. This process is inefficient, as it takes a long time and does not provide for collecting malware-related statistics for future malware detection and appropriate cure. It also does not save the scripts that can be used for curing similar problems in the future.

It is apparent that improved techniques for detecting viruses and malware as well as providing cure are desirable. Accordingly, there is a need in the art for a system and method that addresses the need for automated collection of malware-related statistics and providing an effective cure to infected computer systems.

SUMMARY OF THE INVENTION

The present invention is intended as a method and system for identification of malware components based on automatically collected statistical data and for providing effective cure to infected computer systems that substantially obviates one or several of the disadvantages of the related art.

In one aspect of the invention there is provided a system, method and computer program product for identifying malware components on a user's computer system and administering appropriate cure. According to the exemplary embodiment, the cure scripts are automatically generated based on collected comprehensive malware-related statistical data.

In one embodiment, the statistical data is based on generated protocol logs of a malware-affected computer system. The protocol logs are stored in the statistics database. In another embodiment, the statistical data is collected through emulation of known malware components. The emulated protocol logs are also stored in the statistics database. Cure solutions against malware in a form of scripts are also stored in the database for future references. According to the exemplary embodiment, both collection of malware statistics and cure script generation processes are automated. The proposed system constantly collects malware-related statistics (i.e., self-teaches) and effectiveness of the cure provided to infected computer systems is improved with time.

In another aspect, there is provided a system for curing a computer against malware components and collecting malware-related statistics, the system including a processor; memory and computer code loaded into the memory for implementing the above functionality.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a method, system and computer program product for automated collection of malware-related statistical data is provided. The proposed method and system also provide for an effective cure of malware-infected user computer systems.

In one aspect of the invention there is provided a system, method, and computer program product for identifying malware components on a user's computer system and administering appropriate cure script. According to the exemplary embodiment, the cure scripts are automatically generated based on automatically collected comprehensive malware-related statistical data.

In one embodiment, the statistical data is based on generated protocol logs of malware-affected computer systems. The protocol logs are stored in the statistics database. In another embodiment, the statistical data is collected through emulation of known malware components. The emulated protocol logs are also stored in the statistics database. The cure solutions against malware, in form of cure scripts, are also stored in database for future reference.

According to the exemplary embodiment, collection of malware statistics and cure script generation are automated. The proposed system constantly collects malware-related statistics and, thereby, the system is self-taught. The cure scripts are automatically generated in text format and provided to the user for implementing quarantine of the suspected files. The results of the quarantine are evaluated and the evaluation output with found errors are reported and stored for future reference. The malware-related statistics database is updated with each user request. Thus, effectiveness of the cure provided to infected computer systems improves with time.

Figure 1:
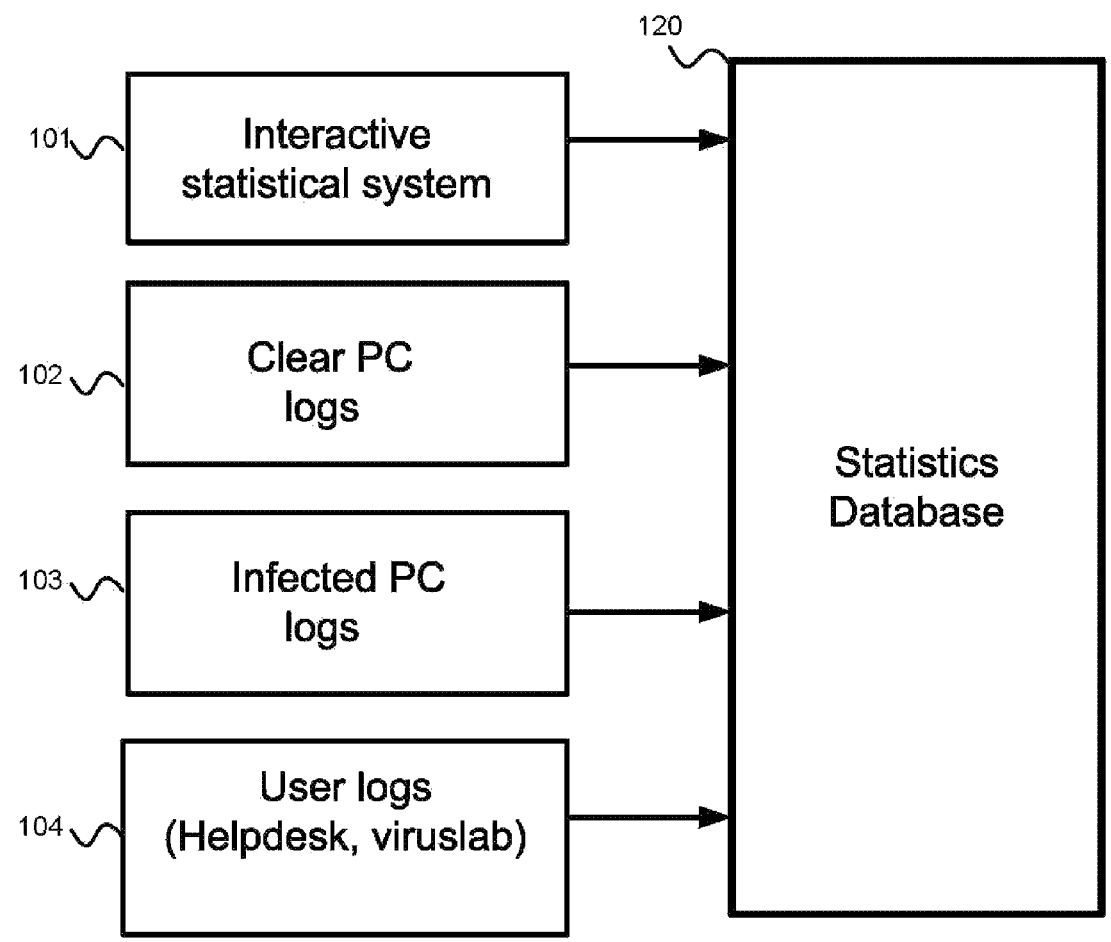
FIG. 1 illustrates a system for collecting statistical data in accordance with the exemplary embodiment.

FIG. 1 illustrates an exemplary system for collecting malware-related statistical data. An interactive statistical system 101 is a module that analyzes objects of a user's computer system. The analysis includes comparing all system files against the database of "clean" objects and against the database with electronic digital signatures of objects. The comparison is performed using checksums and digital signatures. Even if the checksum of the object differs from a clean object by just one bit, the object is considered to be suspect and it will placed in the statistics database 120.

According to the exemplary embodiment, the statistics database 120 contains comprehensive collection of information for each file that cannot be found in the database of "clean" objects and in the database of electronic digital signatures. The information can include full file name, source of origin, file attributes, file size, location, etc.

The user object is also placed in the database 120 if its signature does not match a valid digital signature of a system object. If the user object is determined to be not a legitimate system object, it is also placed in the database 120. The interactive statistical system 101 collects statistics for all suspect objects, including downloaded or dynamic-link libraries (DLLs), drivers, extension modules, etc. In other words, statistics are collected on all files that can self-activate and propagate through the computer system and can potentially perform malicious acts on user's computer system. Note that in exemplary embodiment, collection of statistics is performed on users' computers periodically. Therefore, the statistics database 120 is constantly updated.

Thus, all of the suspicious objects of the user's computer system are stored in the statistics database 120 for further analysis. For example, if a user's MS Internet Explorer® has an unknown plug-in or a toolbar and its checksum is different from a checksum of any MS Internet Explorer® plug-in, and it also does not match any valid signature, then it should be placed into the statistics database 120. However, this plug-in can be a trial version of a third-party vendor product that does not contain any malicious code. In order to determine this, further analysis is needed. Note that all of these operations are automatically performed by the interactive statistical system 101.

A "clean" computer system 102 is also analyzed and a log of all protocols is stored in the database 120. Thus, statistical data of an absolutely clean computer system is generated and stored for the future reference. The analysis of a clean computer system allows for producing a log of protocols reflecting the representation of the objects of the clean computer system. These operations can be performed in a semi-automatic mode. In other words, a clean computer system can have a special component for protocol generation installed. A user has to launch this component in order to generate the log of protocols.

According to the exemplary embodiment, for collecting more comprehensive statistical data, an infected computer system 103 is used. In other words, infection of a computer system with different viruses is simulated in a special protected environment. The computer system 103 is intentionally infected with one of the known viruses. Automatic analysis of the infected computer system 103 is performed by the interactive statistical system 101. In order to collect more statistics (i.e., different protocols), a number of infected computer systems running different versions of OS can be used. For example, an infected MS Internet Explorer® running under Windows XP® platform can produce a different protocol than an MS Internet Explorer® infected with the same virus but running on a VISTA® platform.

A protocol for each virus is generated. This procedure provides information on how each virus is represented in the analysis protocol. The protocols are logged and saved into the database 120. For example, if a virus changes a checksum of the MS Internet Explorer®, a particular protocol is generated. If this protocol is generated in the future when user's computer system is analyzed, the corresponding virus can be detected and cured. The protocols are stored in the database 120 in HTML and XML formats.

According to the exemplary embodiment, the logs of user protocols 104 are provided through a helpdesk or through a virus info reporting system. These protocols can be taken when end users who experience problems contact the helpdesk or report a problem to the virus lab and after that they can be taken and analyzed by specialists. Alternatively, the protocols can be generated by activating a special analysis module installed on the user's computer system.

Figure 2:
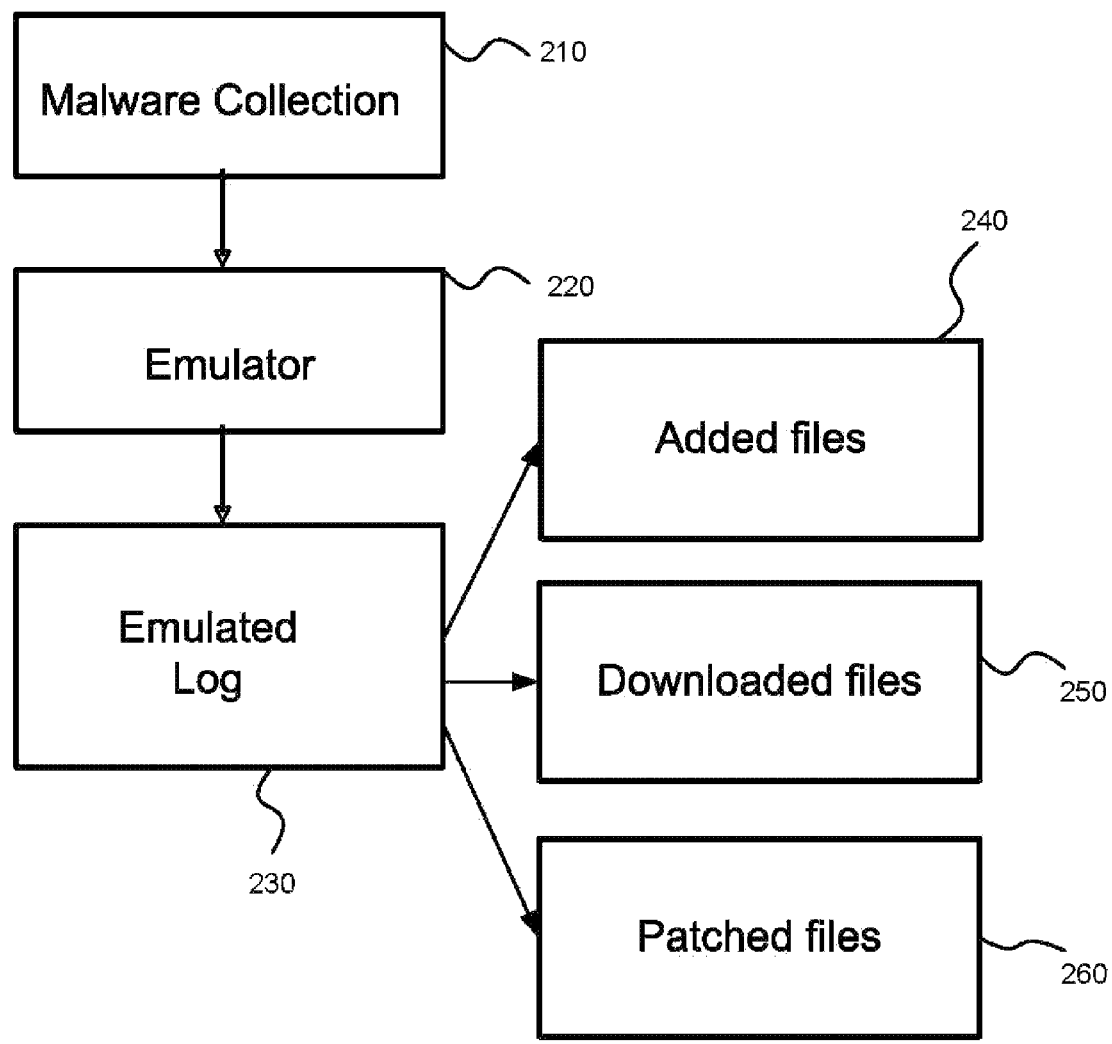
FIG. 2 illustrates a malware emulation system, in accordance with the exemplary embodiment.

Additional statistical information can be produced by malware emulation illustrated in FIG. 2. The malware collection 210 is used. The collection 210 is a database of known viruses. Note that presently about twenty millions of viruses (i.e., malware components) are known. According to the exemplary embodiment, the malware is classified by its functionality and combined into families. The malware of the same family is generally the same in terms of how it works. Thus, samples of each family can be emulated separately. Generally, emulating just some of randomly selected malware samples of the same family is sufficient for producing comprehensive statistical data.

The emulator 220 automatically emulates a launch of a particular malware from the collection 210 in the virtual environment and produces a protocol log 230. The protocol 230 specifies the information about the files installed (i.e., added to a computer system) by the malware 210. The information about the added files can include, for example, file name, file size, location of the file, etc. The protocol logs 230 related to the added files are stored in the dropped files database 240.

According to the exemplary embodiment, the emulator 220 also emulates malware-related file downloads and generates a protocol 230 specifying what files were downloaded by the malware 210, from which location and to where in the OS these files had been placed. The protocol logs 230 related to the downloaded files are stored in the downloaded files database 250. Furthermore, the emulator 220 automatically produces a protocol log 230 reflecting the files that were affected and/or modified (i.e., patched) by the emulated malware 210. The protocol logs 230 related to the patched files are stored in the patched files database 260.

Those skilled in the art will appreciate that the exemplary embodiment depicted in FIG. 2 allows for automatic collection of comprehensive malware-related data in a very fast manner. For example, emulation of one malware sample from the malware collection 210 takes 10-15 second on an average. Therefore, a large amount of malware samples can be emulated and processed in a short period of time. All of the emulated protocols 230 can be added to the statistics database 120 (see FIG. 1). Thus, the proposed system for collecting malware statistics is constantly automatically updated (i.e., self-taught). According to the exemplary embodiment, the quality and effectiveness of the cure provided to the infected clients also constantly improves based on growing statistics database 120.

Figure 3:
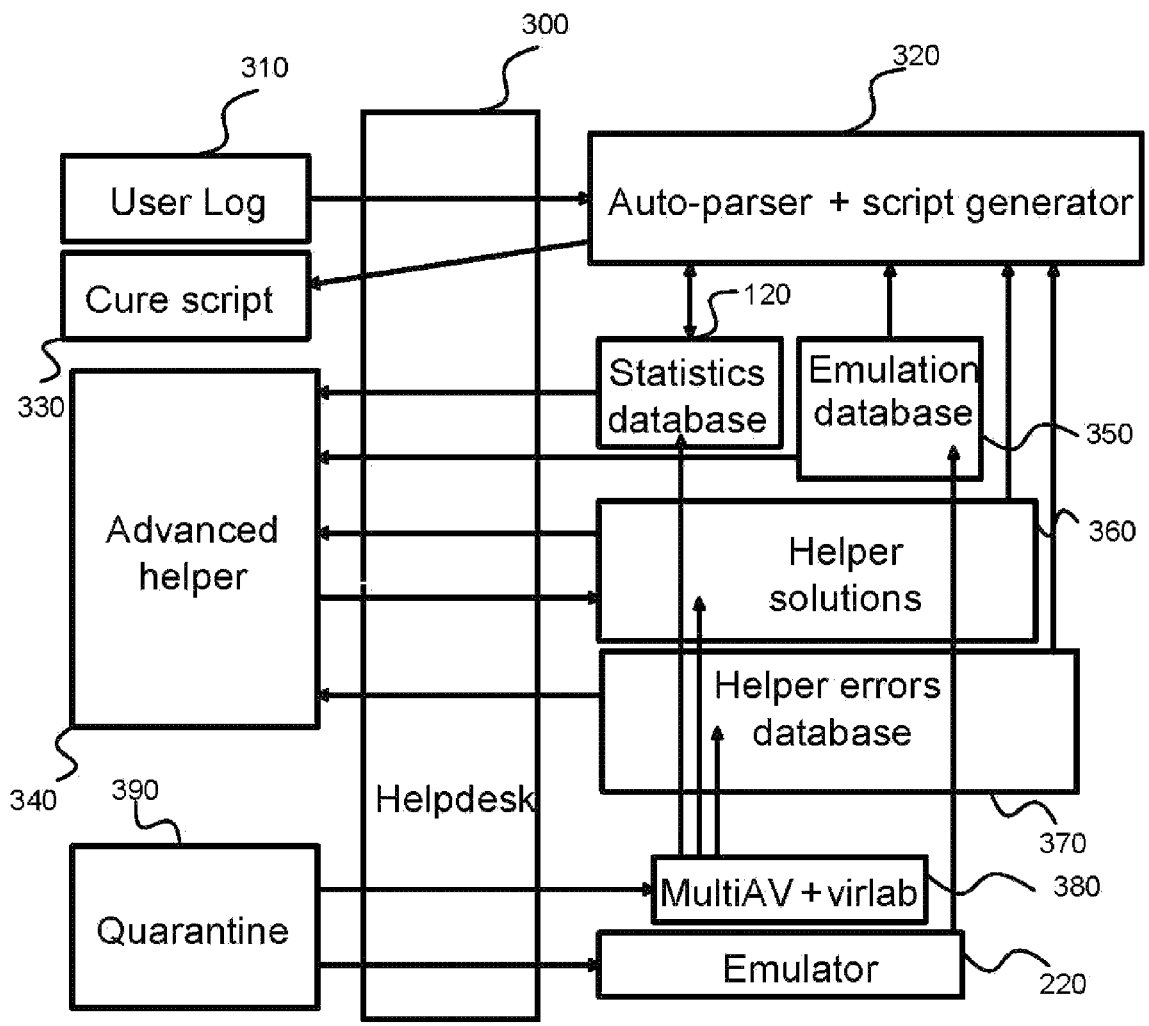
FIG. 3 illustrates a system for curing the infected computer systems, in accordance with the exemplary embodiment.

FIG. 3 illustrates a system for providing a cure to a malware-infected user computer system in accordance with the exemplary embodiment. First, a protocol is generated on a user computer system. The log 310 of user protocols is provided to a helpdesk 300. According to the exemplary embodiment, the user protocols are automatically generated in HTML and XML formats. If the user suspects that his computer system is infected by a malware, then this needs to be confirmed and the appropriate cure script 330 needs to be generated and provided to the user.

This process is implemented in the following manner. The helpdesk 300 routes the user log 310 to the auto-parser 320 that has a script generating module. The auto-parser 320 stores user log 310 into the statistics database 120 and analyzes the log 310. The auto-parser compares the log 310 against data contained in the statistics database 120. The statistics database 120 contains information about all clear (i.e., legitimate) objects as well as information on all known malware components. Therefore, the auto-parser 320 determines whether the user's computer system is infected by malware, or whether it has some rare third-party objects installed on it.

The determination is made by matching the checksums from the log 310 against the checksums of clean objects stored in the database 120. If the matching checksum is not found, than an object is not a clean object and could be a malware. However, further determination is needed. Other methods based on comparing object parameters (such as, for example, name, location, size, etc.) with similar parameters of the clean objects, are employed. Then, the suspect object is compared against the signatures of known malware objects stored in the database 120.

If the match is not found, the suspect component is might be a new malware component. In this case, the secondary characteristics of the suspect component (such as, for example, names of affected files, list of dropped files, list of patched files, acquired functionality, etc.) are compared with characteristics of emulated (by the emulator 220) known malware components stored in the emulation database 350. Thus, by analyzing the secondary characteristics of the suspect object, it can be confirmed with some probability that a new malware had been introduced to the user's computer system.

Before further analysis of the suspect component is performed, the script generator of the auto-parser 320 generates the script that, when executed, puts all suspected objects into quarantine 390, and then, an administrator of an advanced workstation module 340 performs subsequent analysis of these objects. The advanced workstation module 340 is a client-server type system coupled to the statistics database 120 and to the emulation database 350. The advanced workstation module 340 workstation is also connected to the auto-parser 320 and also receives a cure script automatically generated by the auto-parser 320. Such a script can suggest quarantining certain files and can also provide explanations for why this is needed. The administrator of the advanced workstation 340 workstation performs further analysis of the secondary data associated with the suspect object using the statistics database 120 and emulation database 350. Advanced workstation module 340 also analyzes errors of the helpdesk 300.

The administrator can order add or remove commands from the script. For example, the administrator can decide to quarantine more files or not to quarantine certain files based on his analysis of statistical data contained in the databases 120 and 350. The helper solutions 360 suggested by the administrator are stored for future references. In other words, when a script is automatically generated for a similar suspect object next time, the decisions made by the administrator will be taken into account. Therefore, the self-teaching aspect of the proposed system is implemented and the more effective cure scripts are generated each time.

The helper solution is passed onto the auto-parser 320, where the final cure script 330 is generated based on the orders of the administrator, and provided to the user. The user executes the script 330 and the files identified in the script 330 are placed in the quarantine 390. The quarantined files are passed onto the multi anti-virus module 380, where they can be scanned by multiple antivirus engines. Also, a virus lab can be involved in this process in more complex cases. Then, the suspected files are emulated by the emulator 220. The results of the analysis are stored in the databases 120 and 350 respectively. The database 350 can be used by an auto-parser for further analysis.

Some of the suspected files can be determined to be clean objects. It manifests that the advanced workstation administrator made an error and the helper error is recorded in the helper errors database 370. Subsequently, the clear object is stored in the statistics database 120. This way the next time such an object is detected it will not be included in the cure script for quarantine.

In some cases, the quarantine of the file identified in the cure script might not be successful. In other words, this file cannot be quarantined by regular means. This error is also recorded in the database 370 for future reference. In some cases, the file is not identified for the quarantine, yet its emulation shows potentially malicious behavior. Then, this fact is also recorded and the emulation database 350 is updated.

Note that the exemplary embodiment provides for a fast collection of large amount of malware-related statistical data that, in turn, allows generating effective cure scripts for infected computer systems. The system is self-teaching and its effectiveness improves with more use. In an alternative embodiment, a number of administrators of the advanced workstation module 340 of different levels make decisions regarding the suspect objects. The administrator of the higher level reviews and approves or disapproves the decisions made by the lower level administrator. Then, the final helper solution 360 is stored and passed onto the auto-parser 320 for script generation. The results of helper solution 360 work can be stored in the statistics database 120.

Figure 4:
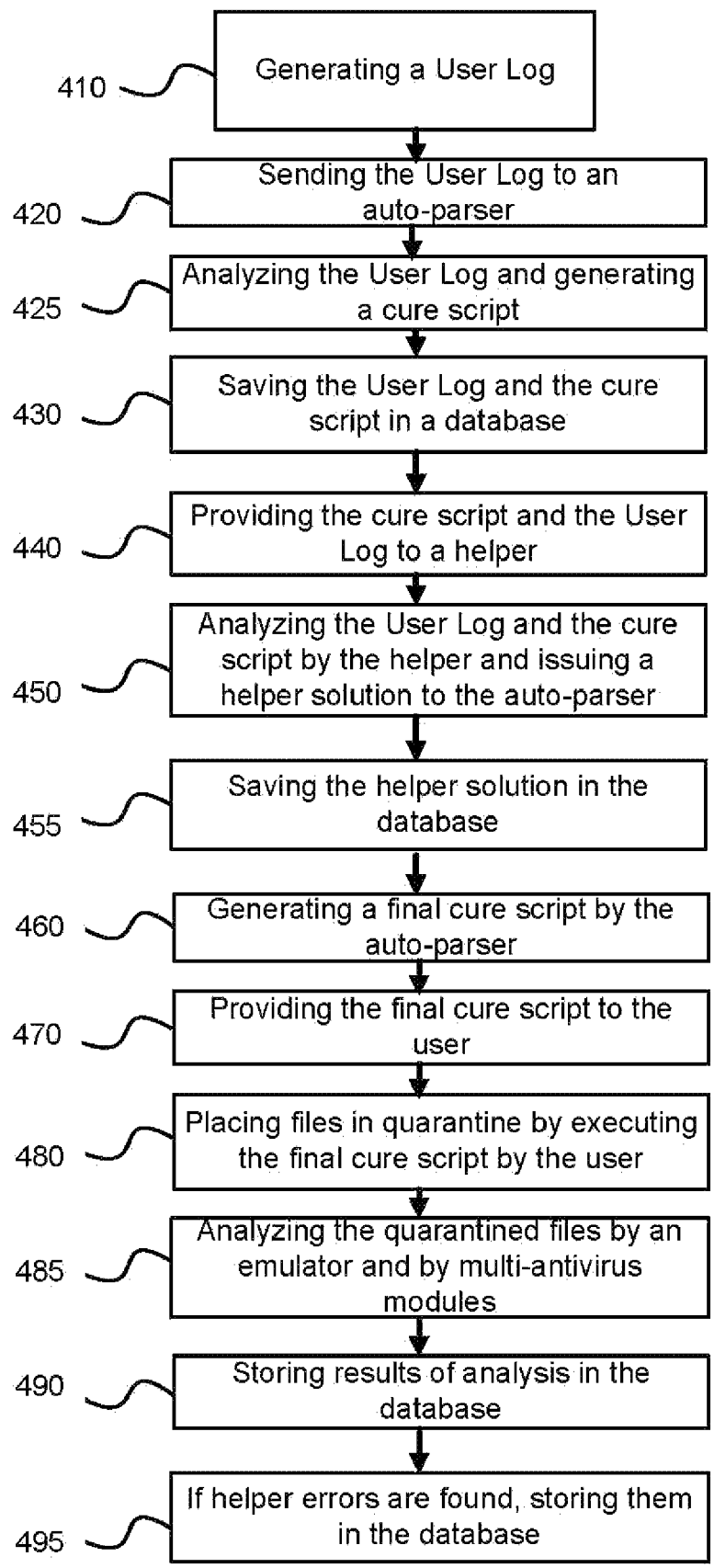
FIG. 4 illustrates a flow chart of a method for curing the infected computer systems, in accordance with the exemplary embodiment.

A flow chart of the method for providing a cure to the malware-infected computer systems is illustrated in FIG. 4. A user log is automatically generated on user's computer system at step 410. The user log is sent to an auto-parser on a server (step 420), where it is being analyzed by the auto-parser, and providing cure script at step 425. The analysis includes comparing the user log against the checksums of clean object stored in the statistics database and against the signatures of known emulated malware components.

The user log and the generated cure script are stored in the statistics database at step 430 and then provided to a helper/administrator at step 440. The cure script and the user log are analyzed by the helper/administrator, who issues the helper solution to the auto-parser (see step 450). The result of execution of the helper solution is recorded in the statistics database at step 455. Then, the auto-parser generates a final cure script taking in account the helper solution at step 460. The final cure script is sent to the user (at step 470) and is executed at step 480. As a result of execution of the cure script the files identified in the script are quarantined (also at step 480).

Then, the quarantined files are analyzed by a multi anti-virus module and also emulated by the emulator for analysis at step 485. The results of the analysis performed at step 485 are stored in the statistics database 120. If some helper errors are found during the analysis performed at step 485, they are stored in the database.

According to the exemplary embodiment, malware cure can be implemented using special security wizards. An arbitrary number of wizards can be used. For example, a troubleshooting wizard is used for fixing serious system problems resulting from system registry modifications performed by malware. These modifications can be, for example, various blocks, substituting a proper response for starting an executable file or for a system configuration process, etc.

Another example of a wizard is a security tweaking wizard. This wizard finds and fixes various problems in a security system, such as, for example, allowing autostart from flash drives, installation and launch of ActiveX without permission, etc. Yet another example of a wizard is a privacy cleaning wizard. This wizard finds and deletes results of user actions, such as, for example, user protocols, cached data, cookies, autofilled lists, etc.

From an execution stand point, a wizard is a part of an anti-malware solution, which has an updatable database containing a plurality of CHECK scripts and FIX scripts. The CHECK scripts are the scripts used for finding malware-related problems, and the FIX scripts are the scripts used for curing the detected problems. A result of an execution of the CHECK scripts is a log listing all the identified problems. This log is used for curing the problems by execution of the FIX scripts. According to the exemplary embodiment, the problems are not only cured, but are also rated. Each CHECK script assigns a rating to a problem from 0 to 3, where 0 means that no problem is detected and 3 means that the problem is severe.

A helper can cure the detected problems by invoking an automatically generated cure script. Using the problem ratings, a helper can include a command into the cure script to fix all problems with medium to high ratings found by the troubleshooting wizard. The rating is based not only on the problem itself, but on its consequences. In an anti-malware system, according to the exemplary embodiment, another invisible wizard is used automatically for cleaning up consequences of execution of the cure script.

This wizard looks for files that have been deleted by the cure script. The wizard checks whether the deleted files belonged to parts of a system registry and whether these parts of the system registry need to be corrected. Then, the wizard makes corrections if needed. For example, if registry correction is not performed, then the system may not load after being cured, because malware was written into the registry as a part of a start up process.

Figure 5:
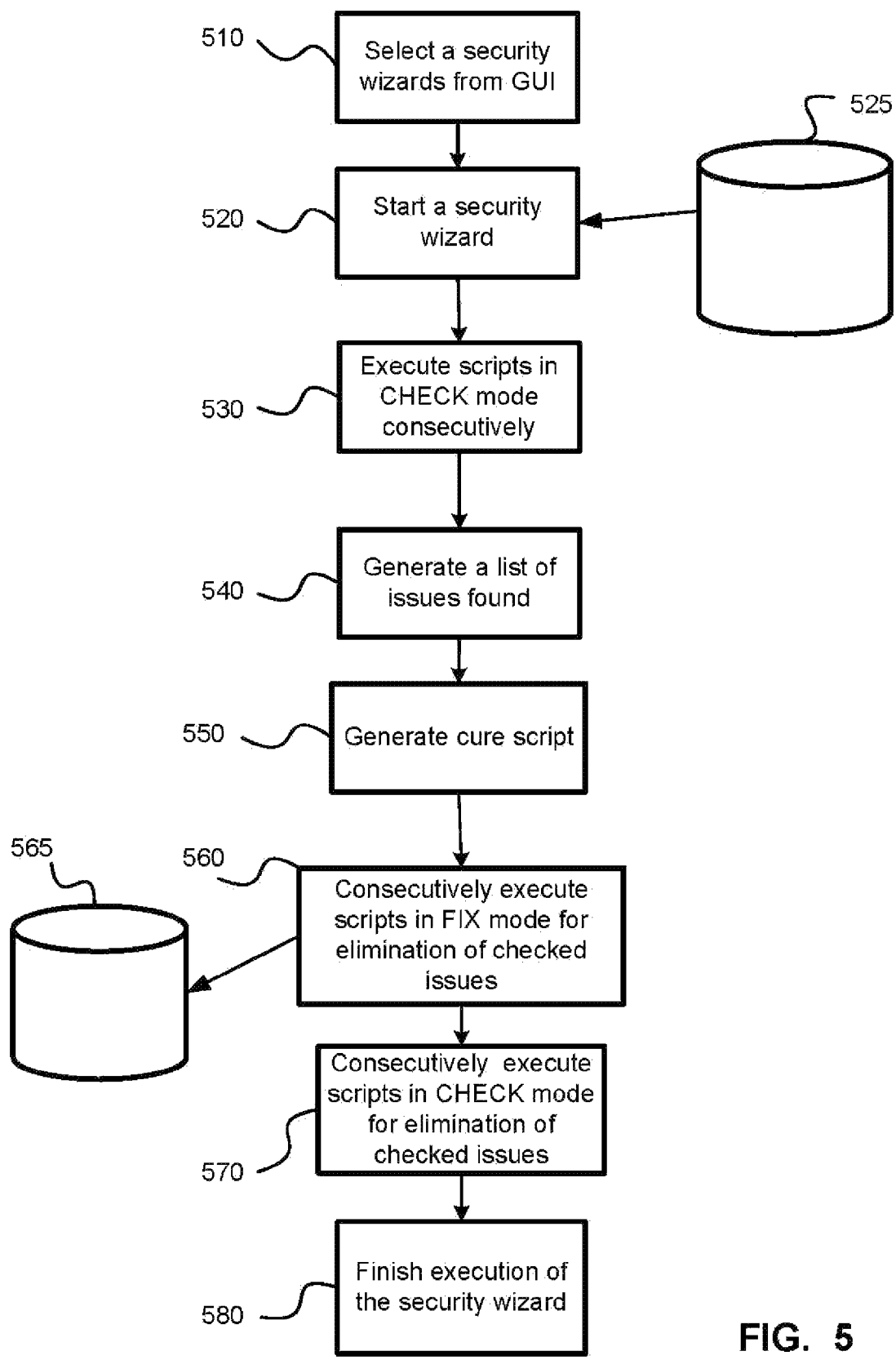
FIG. 5 illustrates a flowchart of an exemplary security wizard, in accordance with the exemplary embodiment.

FIG. 5 illustrates a flowchart of an exemplary security wizard implementation. At step 510 a wizard is selected by a user from a list presented via GUI. After a wizard is selected, required scripts are retrieved from the wizard scripts database 525. Then the wizard is started at step 520. At step 530 scripts are consecutively executed in CHECK mode to find all related issues.

After the execution of these scripts, a list of identified issues is generated at step 540. Then an auto-parser generates a cure script for fixing the found issues at step 550. Then a helper can edit the cure script manually. Alternatively, the user can select the issues he needs to be fixed and the auto-parser will do the remaining work also at step 550. Once the cure script is generated and received, it is executed at step 560. The cure script is executed in FIX mode, saving all changes in the backup database 565.

After the cure script is executed, another check is performed at step 570. At this step scripts are executed in CHECK mode to detect whether or not the issues found at step 540 have been solved. Then, the security wizard displays a report showing the results of the cure script execution to the user at step 580. Execution of the wizard is then finished.

Figure 6:
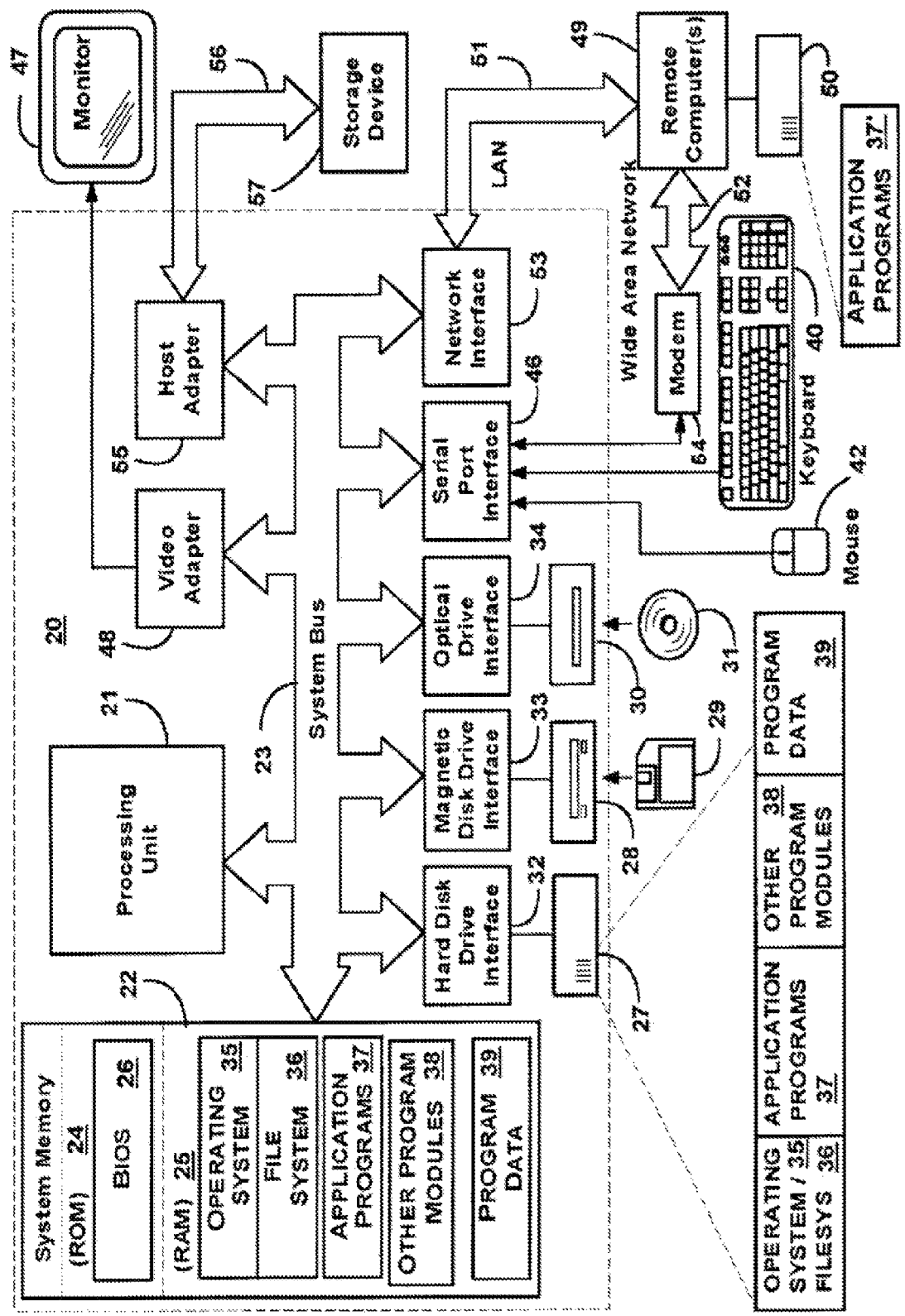
FIG. 6 illustrates a schematic of an exemplary computer system on which the malware invention can be implemented.

With reference to FIG. 6, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for automated collection of comprehensive malware-related data and efficient cure of the infected computer systems. It should also be appreciated that various modifications, adaptations and alternative embodiments thereof may be made within the scope and spirit of the present invention. The invention is further defined by the following claims.

What is claimed is:

1. A method for curing a computer against malware components and collecting malware-related statistics, the method being executed on a computer having a processor and a memory, the method comprising:
 (a) receiving a protocol log of a user computer;
 (b) providing the protocol log to an auto-parser;
 (c) analyzing the protocol log and generating a first cure script by the auto-parser;

(d) storing the protocol log and the first cure script in a database;

(e) generating a helper solution based on the first cure script;

(f) storing the helper solution in the database;

(g) sending the helper solution to the auto-parser;

(h) generating a second cure script based on the helper solution by the auto-parser;

(i) providing the second cure script to the user;

(j) receiving quarantined files from the user, wherein the files are quarantined by execution of the second cure script; and (k) repeating the steps (b) through (j) for another protocol log.

2. The method of claim 1, wherein the protocol log is automatically generated by a component provided to the user.

3. The method of claim 1, wherein the protocol log is in HTML format.

4. The method of claim 1, wherein step (c) further comprises comparing objects of the protocol log against clean objects and known malware components, wherein the checksums and signatures of the objects are used.

5. The method of claim 4, further comprising storing results of the analysis in the database.

6. The method of claim 5, further comprising storing any helper errors in the database.

7. The method of claim 6, wherein the helper errors are any of:
identifying a clean object as a malware component;
identifying a malware component as a clean object; and
unsuccessful quarantine of the files.

8. The method of claim 1, further comprising generating the cure scripts in a text format.

9. The method of claim 1, further comprising analyzing the files placed in the quarantine, wherein analysis comprise emulation of the files and anti-virus processing.

10. The method of claim 9, further comprising saving results of analysis in the database.

11. A system for curing a computer against malware components and collecting malware-related statistics, the system comprising:

a protocol log received from a user computer;

an auto-parser that analyzes the protocol log and generates a first cure script by the auto-parser;

a database that stores the protocol log and the first cure script in a database;

a helper solution generated based on the first cure script, the helper solution being stored in the database;

a second cure script generated by the auto-parser based on the helper solution and provided to the user computer; and means for receiving quarantined files from the user, wherein the files are quarantined by execution of the second cure script.

12. The system of claim 11, wherein the auto-parser generates a cure script based on helper solutions provided through the helpdesk, and wherein the malware-related data from the database is used for generation of the cure script.

13. The system of claim 11, wherein the database contains any of:
clean objects;
known malware components;
recorded helper errors;
checksums of clean objects;
signatures of known malware components;
cure scripts;
user protocol logs;
malware emulation data;
helper solutions; and
helper errors.

14. The system of claim 11, wherein the administrator station is located on a client computer and the database is located on a server.

15. A method for curing a computer against malware components, the method being executed on a computer having a processor and a memory, the method comprising:
(a) selecting a security wizard from a plurality of available wizards;
(b) acquiring security wizard check script from a database;
(c) executing the check script;
(d) generating a log of issues identified by the check script;
(e) generating a fix script based on the log;
(f) executing the fix script; and
(g) storing results of execution of the fix script in a database.

16. The method of claim 15, further comprising checking for deleted system registry files and correcting the system registry.

* * * * *